United States Patent [19]

Weyrauch

[11] Patent Number: 4,982,502
[45] Date of Patent: Jan. 8, 1991

[54] TELESCOPIC GUN SIGHT
[75] Inventor: Adolf Weyrauch, Aalen, Fed. Rep. of Germany
[73] Assignee: Carl-Zeiss-Stiftung, Heidenheim/Brenz, Fed. Rep. of Germany
[21] Appl. No.: 489,478
[22] Filed: Mar. 5, 1990

Related U.S. Application Data
[63] Continuation of Ser. No. 268,007, Nov. 7, 1988, abandoned.

[30] Foreign Application Priority Data
Nov. 7, 1987 [DE] Fed. Rep. of Germany ....... 3737856
Nov. 7, 1987 [DE] Fed. Rep. of Germany ... 8714828[U]

[51] Int. Cl.⁵ .............................................. F41G 1/38
[52] U.S. Cl. ..................... 33/248; 350/566; 350/562; 33/245; 33/246; 42/101
[58] Field of Search ............... 350/566, 560, 561, 562, 350/563, 564, 565, 567, 571, 572; 33/245, 246, 247, 248; 42/101

[56] References Cited
U.S. PATENT DOCUMENTS

| 2,496,045 | 1/1950 | Ford | 33/248 |
| 2,997,916 | 8/1961 | Friedman et al. | 33/245 |
| 3,213,539 | 10/1965 | Burris | 33/246 |
| 3,429,634 | 2/1969 | Weaver | 33/246 |
| 3,597,040 | 8/1971 | Gotoh | 33/245 |
| 3,948,587 | 4/1976 | Rubbert | 33/245 |
| 4,247,161 | 1/1981 | Unertl, Jr. | 350/562 |
| 4,255,013 | 3/1981 | Allen | 33/247 |
| 4,389,791 | 6/1983 | Ackerman | 33/246 |

FOREIGN PATENT DOCUMENTS
20195 3/1972 Australia .
3208814 9/1983 Fed. Rep. of Germany .

Primary Examiner—William A. Cuchlinski, Jr.
Assistant Examiner—Diego F. F. Gutierrez
Attorney, Agent, or Firm—Eugene Stephens & Associates

[57] ABSTRACT

In a telescopic gun sight, a widened range of displacement for the inverting system is obtained by the arrangement of the inverting system between the objective and the objective image plane, and the arrangement of the reticle in the eyepiece image plane. An improved tiltable mounting of the auxiliary tube containing the inverting system is provided by forming the tiltable joint for the auxiliary tube as flexible or elastic monolithic joint.

14 Claims, 1 Drawing Sheet

TELESCOPIC GUN SIGHT

RELATED APPLICATIONS

This application is a continuation of parent application Ser. No. 268,007, filed Nov. 7, 1988, entitled TELESCOPIC GUN SIGHT, and abandoned upon the filing of this continuation application.

BACKGROUND OF THE INVENTION

This invention relates to a telescopic gun sight. Such sights in various forms are well known in the art.

In typical telescopic sights of the prior art, there is a tubular telescope attached to the gun barrel. The telescope has an objective and an eyepiece or ocular. The target is imaged in the plane of the objective in laterally reversed and upside down orientation. An optical inverting system arranged within the tubular housing serves to erect the image and images it in the plane of the eyepiece, where it is viewed by the eyepiece.

In order to estimate the distance away of the object or sighted target, there is a reticle (a grid of crossed lines) mounted in the objective or eyepiece image plane, in the telescopic gun sights of known construction. In order to obtain a variable magnification, the optical elements of the inverting system of the known sights are made displaceable, and the point of attack or point of action of the displacement device is located in the vicinity of the objective image plane, the necessary path of displacement resulting from the angle of the target line displacement multiplied by the focal length of the objective. In order to change the target line (that is, to make necessary lateral and vertical corrections in the line of sight relative to the gun barrel on which the telescopic sight is mounted to compensate, respectively, for such variables as windage and the effect of gravity on bullet trajectory), it is furthermore known to mount the inverting system tiltably so as to be movable toward all sides in the telescope tube. Such known tiltable inverting systems are often organized within an auxiliary tube pivotally mounted at one end, the pivotal mounting being in the form of a circular or spherical bearing, or comprising a support surface made from an elastomer or other resilient material. It is also known to shift the pivot point of the tilting into the eyepiece image plane.

SUMMARY OF THE INVENTION

An object of the invention is to provide a telescopic gun sight in which the greatest possible displacement of the target line is obtained with a predetermined displacement path of the inverting system.

Another object is to provide the inverting system with a friction-free suspension which, while being simple to produce and mount, assures a high precision of the correction adjustments.

These objects are achieved by the construction herein disclosed in which the auxiliary tube containing the erecting system is pivoted at one end to permit its other end to be displaced out of alignment with the optical axis of the main telescope tube, and a portion of the auxiliary tube in proximity to its pivot end is formed as a monolithic spring joint which is elastically deformed when the other end of the auxiliary tube is displaced.

The advantages resulting from the invention include, in particular, the fact that, with given dimensions of the telescopic sight, the displacement of the target line is considerably increased as compared with telescopic sights of known construction. For instance, in a telescopic gun sight according to the invention, the displacement of the target line is 50% greater than in a sight of known construction. Another advantage of the invention is that the displacement of the target line is independent of any slight longitudinal or a transverse displacement of the pivot end of the tiltably mounted inverting system during manufacture and/or assembly.

DESCRIPTION OF THE PREFERRED EMBODIMENTS

Figure 1:
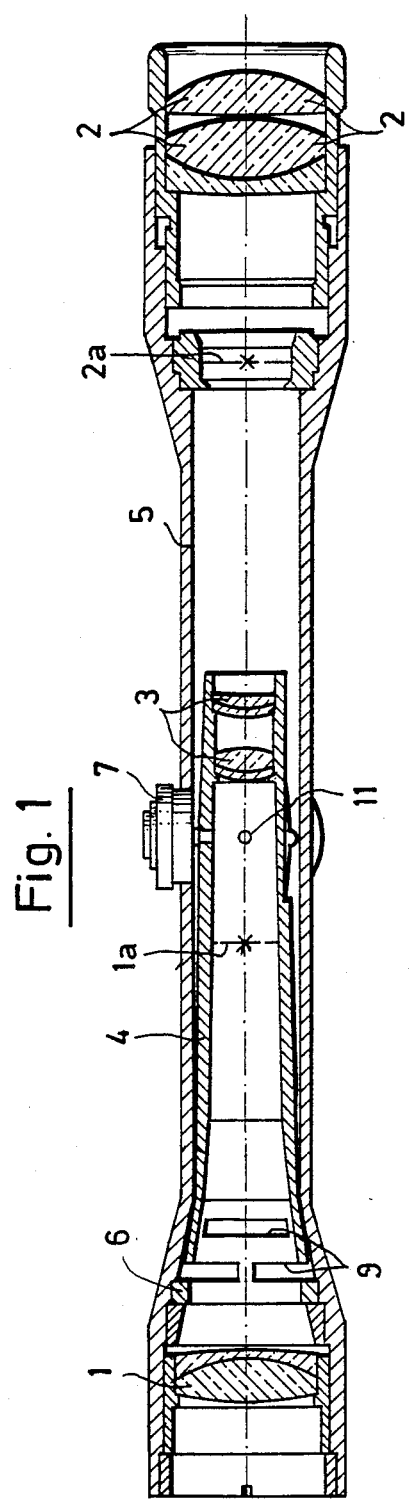
FIG. 1 is a section through a sight in accordance with another embodiment of the invention.

In the telescopic gun sight shown in FIG. 1, there is an objective 1, an eyepiece 2, and an inverting system 3. For the sake of simplicity the optical systems for objective, eyepiece, and inverting system have, been symbolized merely as a single lens element, but those skilled in the art will recognize that in each case the system may be, and usually is, composed of a plurality of elements or components including means for displacing the lens or lenses of the inverting system longitudinally along the optical axis to vary magnification of the gun sight.

The inverting system 3 is mounted in an auxiliary tube which is itself mounted in the main tube 5 of the sight being tiltable about a pivot end 6. One or more reticles (not separately shown) are coincident with the objective image plane 1a. The eyepiece image plane is at 2a. There is an adjustment screw 7, and the end of screw 7 ads as the action point for tilting the auxiliary tube 4 within the main tube 5. A spring 8 holds the auxiliary tube against the adjusting screw.

In one preferred embodiment of the invention illustrated in FIG. 1, the portion of auxiliary tube 4 which is in proximity to its pivot end 6 is formed as a monolithic spring joint which is elastically deformed upon displacement of auxiliary tube 4 in response tot he movement of adjustment screw 7 and/or adjustment screw 11. While only the end, i.e., the action point, of screw 11 is shown, it will be understood that adjustment screw 7 is used to compensate for elevation, while adjustment screw 11 compensates for windage and parallax. Pivot end 6 of auxiliary tube 4 does not itself pivot in its mounting on main tube 5 when auxiliary tube 4 is displaced, and thus it is free of the friction between relatively moving parts which occurs at the pivot ends of the auxiliary tubes in prior art constructions.

Figure 2:
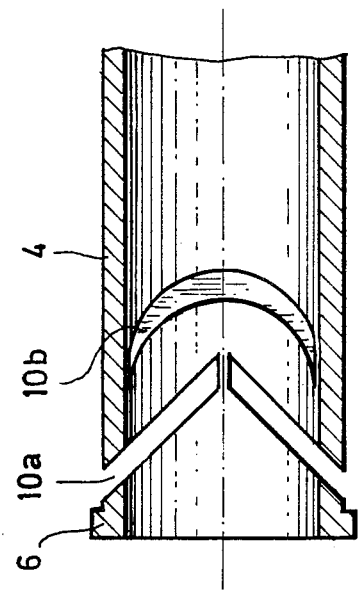
FIG. 2 is a fragmentary detail of an alternative form of monolithic spring joint according to the invention.

To increase the elastic deformability of the joint, the tube 4 is weakened in the vicinity of the Joint by providing slits or slots in the tube. These may take the form of the series of rectangular slits or slots 9 offset both circumferentially and longitudinally from each other as illustrated in FIG. 1. Also, they may be of other shapes, such as the oblique slots 10a and/or the elliptically extending or arcuate slots 10b shown in FIG. 2.

The reticle is mounted in the eyepiece image plane 2a. The point of attack or point of action for the displacement of the inverting system 3 lies behind the objective image plane 1a by an amount S which is defined by the expression $$\frac{L'}{2(1-\beta)} \leq S \leq \frac{L'}{1-\beta}$$

where L' is the distance between the objective image plane 1a and the eyepiece image plane 2a, and $\beta$ is the magnification of the inverting system. In this case, the displacement of the target line is independent of transverse displacement of the pivot point of a tilting. In the embodiment shown in FIG. 1, L=96 mm, $\beta=-2$, and S is in the range of 16 mm to 32 mm.

What is claimed is:

1. In a telescopic gun sight with a main tube which has sight adjustment means including a movable action point, said main tube also having an optical axis along which are mounted an objective with an objective image plane and an eyepiece with an eyepiece image plane, an auxiliary tube positioned between said objective and said eyepiece and pivotable about one of its ends for displacement of the other end thereof out of alignment with the axis of said main tube in response to the movement of said action point, and an inverting system arranged within said auxiliary tube, the improvement wherein the portion of said auxiliary tube adjacent said pivot end is formed as a spring joint having sufficient flexibility to permit the displacement of its other end.

2. A gun sight as defined in claim 1, wherein said point of action for displacement of said inverting system is arranged behind said objective image plane (1a) by an amount S which is defined by the expression $$\frac{L}{2(1-\beta)} \leq S \leq \frac{L}{1-\beta}$$

where L is the distance between the objective image plane (1a) and the eyepiece image plane (2a), and $\beta$ is the magnification of the inverting system.

3. A gun sight as defined in claim 2, wherein S is in the range of 16 mm to 32 mm.

4. A gun sight as defined in claim 2, wherein L is 96 mm, $\beta$ is $-2$, and S is in the range of 16 mm to 32 mm.

5. A gun sight as defined in claim 1, wherein said spring joint portion is formed by providing slits in said auxiliary tube to increase flexibility thereof at said portion.

6. A gun sight as defined in claim 5, wherein said slits extend transverse to the optical axis of the gun sight.

7. A gun sight as defined in claim 5, wherein said slits extend obliquely with respect to the optical axis of the gun sight.

8. A gun sight as defined in claim 5, wherein said slits are elliptical.

9. A gun sight as defined in claim 5, wherein said slits are curved.

10. A telescopic gun sight comprising a main tube (5), an objective (1) in said main tube, an eyepiece (2), an auxiliary tube (4) within said main tube between said objective and said eyepiece, an inverting system (3) arranged in said auxiliary tube, and flexible mounting means for said auxiliary tube enabling said auxiliary tube and said inverting system to be pivoted about one end thereof and tilted relative to said main tube, said mounting means including a portion of said auxiliary tube in proximity to said pivot end formed as a spring joint.

11. A gun sight as defined in claim 10, wherein said spring joint portion is formed by providing slits in said auxiliary tube to increase flexibility thereof at said portion.

12. A gun sight as defined in claim 11, wherein said extend transverse to the optical axis of the gun sight.

13. A gun sight as defined in claim 11, wherein said slits extend obliquely with respect to the optical axis of the gun sight.

14. A gun sight as defined in claim 11, wherein said slits are elliptical.

* * * * *